United States Patent [19]

Sisk

[11] Patent Number: 5,023,500
[45] Date of Patent: Jun. 11, 1991

[54] STATOR LAMINATION WITH ALIGNMENT STRUCTURE FOR CONTROLLED SKEWING

[75] Inventor: Hollis D. Sisk, Chesterfield, Mo.

[73] Assignee: Century Electric, Inc., St. Louis, Mo.

[21] Appl. No.: 341,167

[22] Filed: Apr. 21, 1989

[51] Int. Cl.$^5$ .......................................... H02K 15/02
[52] U.S. Cl. ................................. 310/218; 29/596;
  29/606; 29/638; 310/42; 310/254
[58] Field of Search ............... 29/596, 598, 732, 738;
  310/42, 91, 217, 218, 254

[56] References Cited

U.S. PATENT DOCUMENTS

| | | | |
|---|---|---|---|
| 3,802,068 | 4/1974 | Scott | 29/738 |
| 4,400,872 | 8/1983 | Berges | 29/738 |
| 4,736,516 | 4/1988 | Pfaffenzeller et al. | 29/732 |
| 4,845,837 | 7/1989 | Lloyd | 30/42 |

*Primary Examiner*—Steven L. Stephan
*Assistant Examiner*—D. L. Rebsch
*Attorney, Agent, or Firm*—Rogers, Howell & Haferkamp

[57] ABSTRACT

The stator laminations for a dynamoelectric machine may be first stacked in a concentric orientation and then skewed in a controlled manner after the stator is wound, with a pair of elliptically shaped alignment slots in each lamination holding a pair of alignment bolts of generally circular cross-section, such that the laminations may be first stacked onto the alignment bolts and then skewed by pivoting the alignment bolts, thereby causing relative radial movement between the laminations and the bolts as the bolts are permitted to slide within the elliptical alignment slots. In a second embodiment, a pair of radial projections on the stator laminations and a pair of channel members which surround the radial projections permit relative radial movement and canting of the projections with respect to the channel member as the channel members are pivoted to skew the stator lamination stack.

20 Claims, 3 Drawing Sheets

STATOR LAMINATION WITH ALIGNMENT STRUCTURE FOR CONTROLLED SKEWING

BACKGROUND AND SUMMARY OF THE INVENTION

It is well known in the art that dynamoelectric machines generally include a stator and rotor, with one typical design including a cylindrical rotor which rotates within an annular stator. Also, it is well known that such a stator will include a plurality of windings comprising electrical wire which are laid in a plurality of channels formed by winding slots along the inner periphery of a plurality of stacked annular plate-type stator laminations.

Performance of the dynamoelectric machine of this design can be improved by skewing the stator, i.e. angularly re-positioning successive laminations from the top to the bottom of the lamination stack. Typically, the entire stack of laminations will be skewed one slot width, such that the top lamination is re-positioned one slot clockwise or counterclockwise from the corresponding slot in the lamination at the bottom of the stack, with the intervening laminations making a graduated transition between these two end positions.

In the prior art, automatic insertion type winding machines for automatically winding the stator slots require that the slots be aligned and that the stator be non-skewed. As best known to the inventor herein, there are no automatic insertion type winding machines which can automatically wind a skewed stator lamination stack with skewed winding slots. Thus, it is presently the practice to manufacture stators by first stacking the laminations in a concentric, aligned fashion, for winding, each of the laminations having a pair of slots with the slots positioned at opposite sides of the lamination and near the outer periphery thereof. These slots are generally circular slots and align as the laminations are stacked. A pair of pins or bolts are typically used to position the laminations as they are stacked such that the slots in the laminations are fit over the bolts as the laminations are stacked.

With the stack of laminations thus formed, the winding slots align to create a substantially straight, tunnel-like, winding channel for automatic insertion of the windings. After the stator is wound, pressure is applied to opposite sides of the bolts in a direction tangential to the stator, and at opposite ends thereof, which thus skews the laminations into the desired orientation. After skewing, the stator is welded and the bolts are then removed.

Although this technique works satisfactorily for smaller size stators, i.e. stators below a 280 frame size, this technique will not work for larger stators. There are several reasons for this, perhaps the most important of which is that the alignment bolts must "go over the hill". By that is meant that the bolts must generally twist in a helical fashion with the center of the bolts moving radially outwardly and the ends of each bolt rotating with respect to each other. This contortion of the bolt is caused by the fact that the slots in each of the laminations remain the same radial distance from the center of the stack as the laminations are skewed, so that the series of slots transforms from a straight line into an arc. As the bolt remains within the series of slots, the bolt must contort to follow this transformation in the slot pattern. The bolts which hold the laminations in alignment must thus be rigid enough to maintain the alignment of the laminations, but at the same time flexible enough to accommodate the helical contortion placed on it. For the larger frame sizes, this combination of rigidity and flexibility is virtually impossible to achieve. Therefore, for this and other reasons, the larger frame sizes are typically wound by hand after the lamination stack has been assembled in a skewed orientation.

It should be also noted that the inventor herein is aware of the fact that skewed rotors have been produced in the prior art. Those rotors of which the inventor is aware utilized plate-type laminations much as with the stator design discussed herein, except that there was no winding of the rotors with electrical wire and the rotor laminations were initially stacked in a skewed orientation (much as is presently done for larger frame size stators, as described above). In order to maintain the alignment of the individual laminations as they were stacked in a skewed orientation, rotor laminations were made with elliptical slots on opposite sides thereof such that they could be slipped over a pair of alignment bolts. However, it should be emphasized that these rotor laminations were initially assembled in a skewed orientation, were not wound with electrically conductive wire, and thus the alignment slots did not teach or suggest that they would provide any advantage in transforming a stack of concentrically oriented laminations into a stack of skewed laminations.

In order to solve these problems inherent in the prior art with manufacturing skewed stators, and especially for larger frame sizes, the inventor herein has succeeded in developing an alignment structure and technique which permit stacking of stator laminations in an aligned fashion, with the laminations being stacked concentrically to facilitate winding by automatic winding equipment, and then skewing the wound lamination stack in a controlled manner in such a way as to eliminate any contortion of bolts. Therefore, for the first time, a stator lamination stack may be automatically wound and then skewed for the larger frame size dynamoelectric machines which were heretofore first skewed and then hand wound.

In a first embodiment, alignment bolts are used with the stator laminations each having a pair of alignment slots which are generally elliptical in shape. Thus, as the laminations are stacked over the bolts, they are held in concentric alignment for winding, and then opposing tangential forces exerted at the ends of the bolts which skew the stator. In the skewing process, the slot permits controlled relative movement between the laminations and the bolts in a radial direction such that there is no relative force exerted on the bolts by the laminations, or vice versa. Instead, the bolt is free to move within the generally elliptical slot. In order to increase the bearing surface and facilitate their relative sliding movement, flats may be formed along opposite sides of the bolt to match the sides of the slots. To the extent that flats are used, the length of the elliptical alignment slots should be increased by the length of each flat. Although desirable, it is not believed that the flats are necessary to achieve the controlled skewing without contortion of the alignment bolts.

In an alternative embodiment, the alignment slots are not used but instead projections are formed on opposite sides of each lamination such that they align as the laminations are stacked concentrically. In order to ensure that the laminations remain concentric, alignment channels may be used to maintain the projections in their proper orientation for concentric alignment. Then, in order to skew, the channels are pivoted, with the outer walls of the projections and the inner walls of the channel being formed at such an angle that the projections may move radially with respect to the channel, with the projections canting as they are skewed. Depending upon the position of the particular stator lamination with respect to the stack, the projections will retract from within the channel and cant, but will always remain in contact with the mouth of the channel such that they are physically restrained thereby and held in place. Thus, controlled relative movement in a radial direction and canting is permitted between the channel and the projections in order to achieve a uniformly skewed stator.

While the principal advantages and features of the present invention have been briefly described above, a fuller understanding of the invention may be attained by referring to the drawings and detailed description of the preferred embodiment which follow.

DETAILED DESCRIPTION OF THE PREFERRED EMBODIMENT

Figure 1:
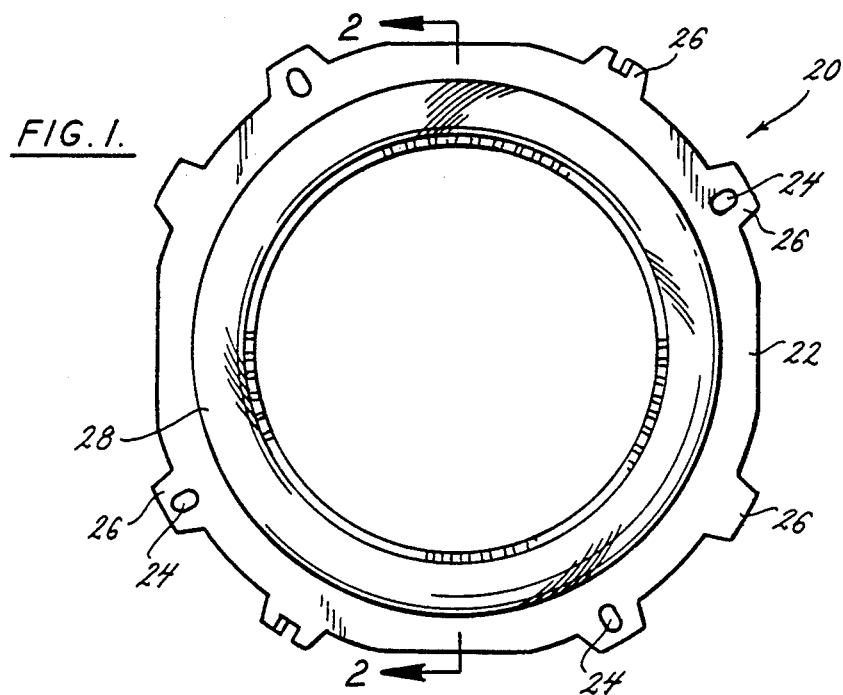
FIG. 1 is an end view of a stator for a dynamoelectric machine.
Figure 2:
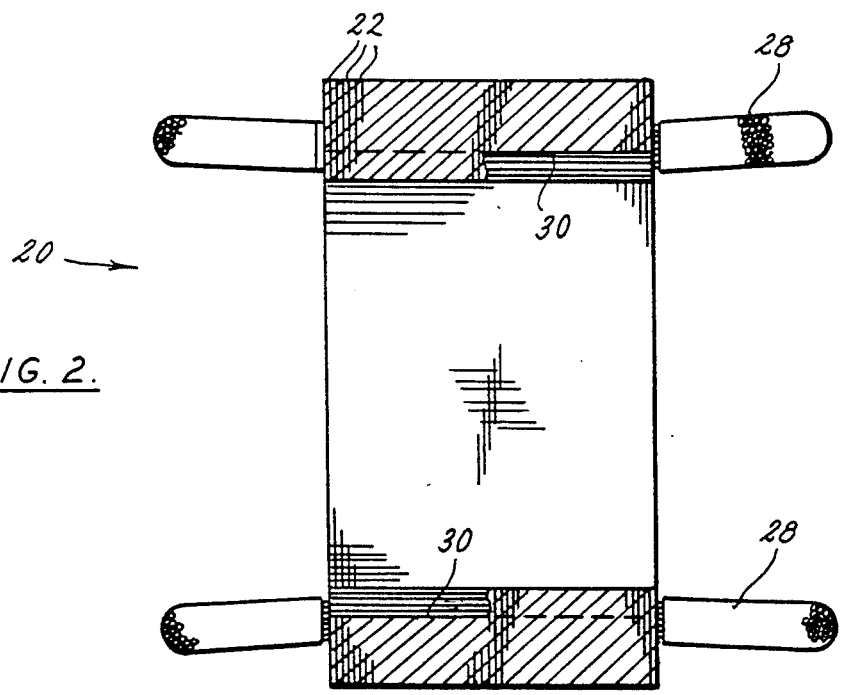
FIG. 2 is a cross-sectional view taken along the plane of line 2—2 in FIG. 2 and detailing the wound stator.
Figure 3:
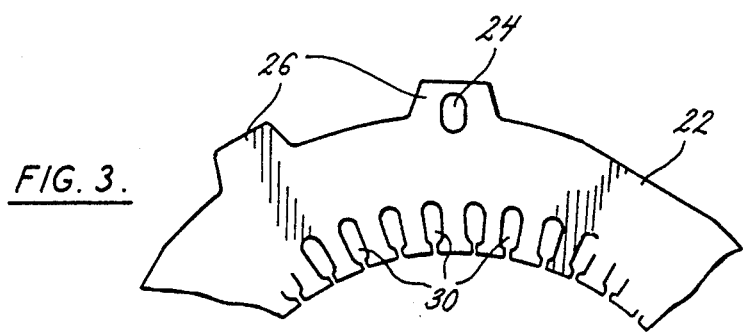
FIG. 3 is a partial view of a portion of a stator lamination showing the alignment slot of the present invention.

A stator 20 is shown in overall view in FIGS. 1 and 2 and comprise a plurality of plate-type laminations 22 each of which have one or more alignment slots 24 or radial projections 26 in accordance with the teachings of the present invention. The stator 20 is wound with a plurality of turns of electrical wire 28 inserted through a plurality of winding slots 30 (FIG. 3) which are oriented along the inner periphery of the annular plate-type lamination 22.

Figure 4:
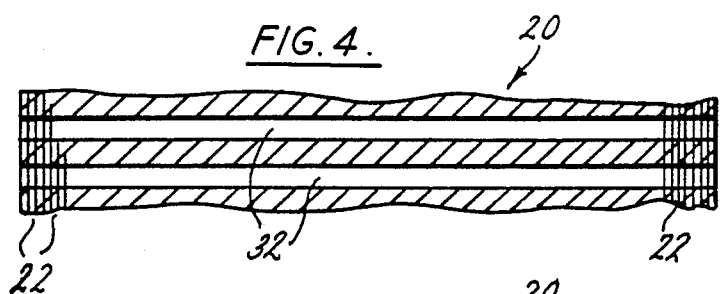
FIG. 4 is a partial side view of a stator showing windings A and B inserted through winding slots in the stator laminations.
Figure 5:
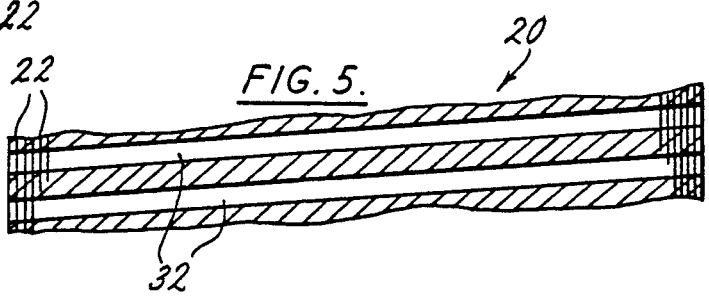
FIG. 5 is a partial side view similar to FIG. 4 except after the stator laminations have been skewed by one winding slot over the height of the stator lamination stack.

As shown in FIG. 4, the winding slots 30 align to form a tunnel-like winding channel 32 for insertion therethrough of the electrical wire 28 comprising the winding. Then, as shown in FIG. 5, the stator lamination stack is skewed by one winding slot to thereby create a skewed stator. After the stator laminations are oriented in the manner shown in FIG. 5, the laminations are welded and fixed in final position.

Figure 6:
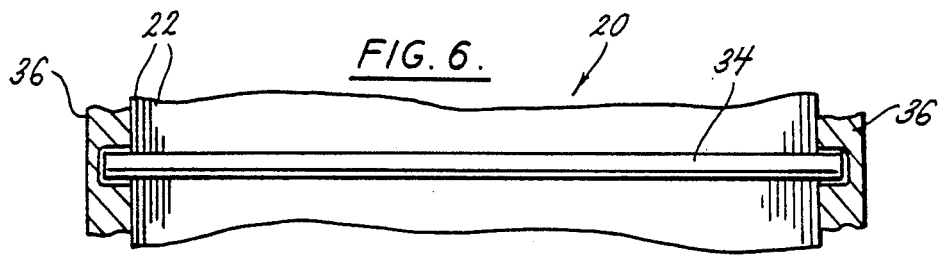
FIG. 6 is a partial side view of a stator lamination with the alignment bolt inserted through the stack of stator laminations with skewing blocks surrounding the ends of the alignment bolt.
Figure 7:
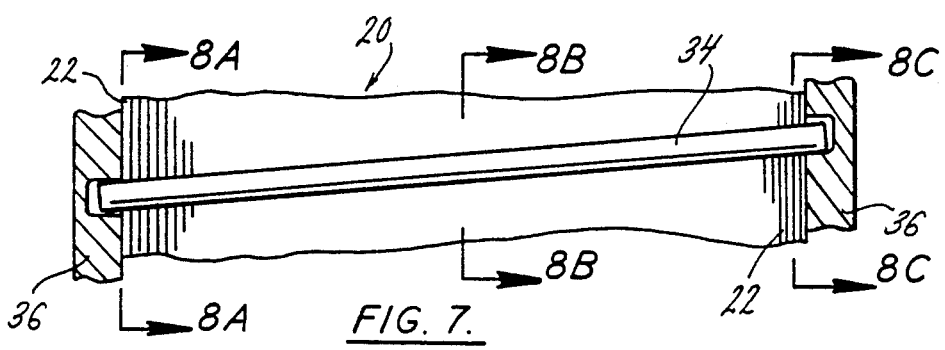
FIG. 7 is a side view of the stator similar to FIG. 6 except that the alignment bolt has been skewed by the skewing blocks.
Figures 8A, 8B, 8C:
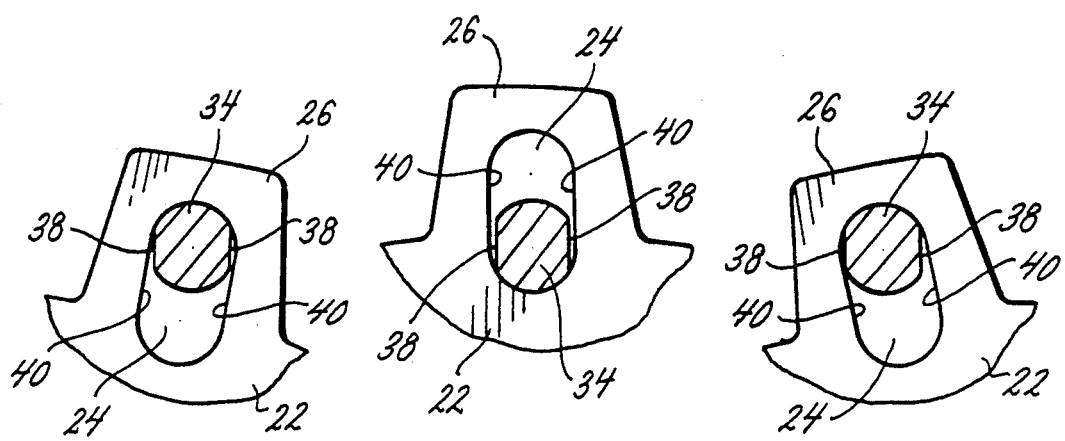
FIG. 8a is a partial cross-sectional view taken along the plane of line 8a in FIG. 7 detailing the relative positions of the alignment bolt and slot at one end of the stack of stator laminations.
FIG. 8b is a partial cross-sectional view taken along the plane of line 8b in FIG. 7 detailing the relative positions between the alignment bolt and the alignment slot near the midpoint of the stator lamination stack.
FIG. 8c is a partial cross-sectional view taken along the plane of line 8c in FIG. 7 detailing the relative positions between the alignment bolt and the alignment slot near the top of the stator lamination stack.

As shown in FIGS. 6-8, alignment bolts 34 are inserted through the alignment slots 24 in a stack of concentrically aligned laminations 22 for purposes of aligning the laminations 22 and holding them in place while the stator stack is wound. After winding, opposing tangential forces are exerted, such as by end blocks 36, against the ends of bolt 34 to re-align the stator laminations in a skewed orientation as exemplified by FIGS. 5 and 7. In doing so, the bolt 34 moves radially with respect to the laminations and is oriented as best shown in FIGS. 8a-8c. At the ends of the stack, or top and bottom of the stack, respectively, the bolt 34 is positioned at the top of alignment slot 24 as best shown in FIGS. 8a and 8c. However, at the approximate midpoint of the lamination stack, the alignment bolt 34 is positioned at the bottom of the alignment slot 24. Although it is difficult to show in the drawings, as suggested by FIGS. 8a-8c, the alignment bolt 34 may have flats 38 on either side thereof which provide a bearing surface against the sides 40 of alignment slot 24. This facilitates movement of the alignment bolt 34 within the slot 24 and ensures a smoother and more reliable skew between the laminations 22. Also, although difficult to depict in the drawings, FIGS. 8a-8c suggest that the alignment bolt 34 must contort in approximate helical fashion in order to follow the difference in canting between the alignment slots 24 shown in FIGS. 8a and 8c. To the extent that the alignment bolt 34 is sized to fit closely within the slot 24, there will be some small amount of helical contortion experienced by the bolt 34. However, such contortion shall be dramatically reduced over that as is experienced in the prior art with the same alignment bolt as used in a circular alignment slot.

The inventor hereof envisions the use of the present invention with dynamoelectric machines having the following parameters:

| O.D. Stator | Stack Height | Rotor Diameter | Frame | KW |
| --- | --- | --- | --- | --- |
| 2 pole 12" | 2"–9" | 6 ⅛" | 280 | 10–50 |
| 4 pole 11 ⅜" | 2"–9" | 7 ⅜" | 280 | 10–50 |
| 15 ⅛" | 4"–13 ⅛" | 10 ⅛" | 360 | 50–150 |
| 19 ⅛" | 7"–19 ⅛" | 13" | 440 | 150–400 |
| 24" | 12"–26" | 16 ⅛" | 580 | 400–1000 |

As can be appreciated, in the largest sizes, the lamination stack height approaches twenty-six inches with an outside diameter for the stator lamination of twenty-four inches in a 580 frame size for up to a 1000kw dynamoelectric machine. These are substantially large machines which would be quite difficult, time-consuming, and expensive to wind by hand versus using the present invention for automatic winding and skewing.

Figure 9:
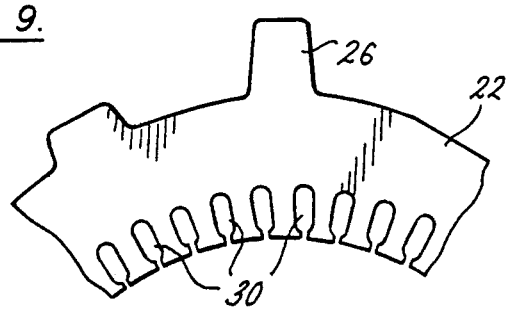
FIG. 9 is a partial view of a stator lamination including an alignment projection of the second embodiment of the present invention.
Figure 10:
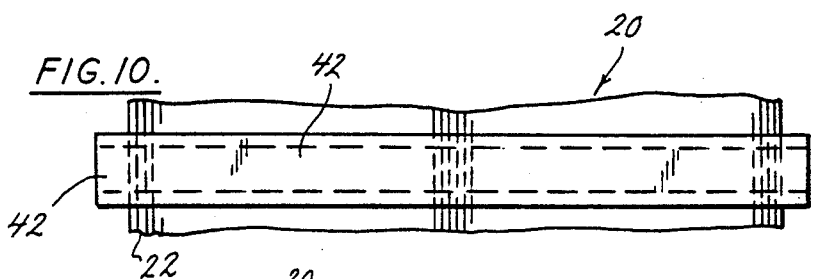
FIG. 10 is a partial side view of a stator lamination stack with a channel member fitted over the projections extending from the stack of stator laminations.
Figure 11:
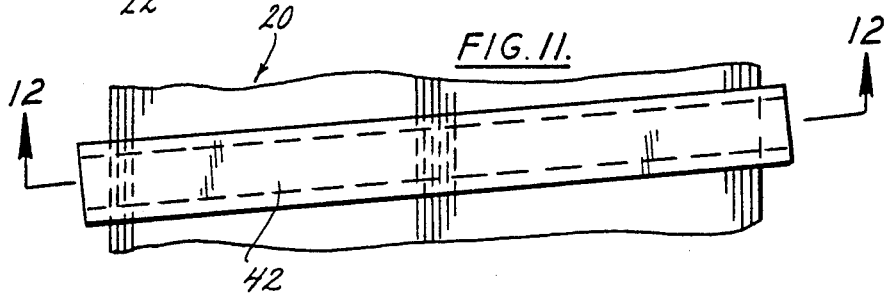
FIG. 11 is a partial side view of a stator lamination similar to that of FIG. 10 except after the channel member has been used to skew the stator laminations.
Figure 12:
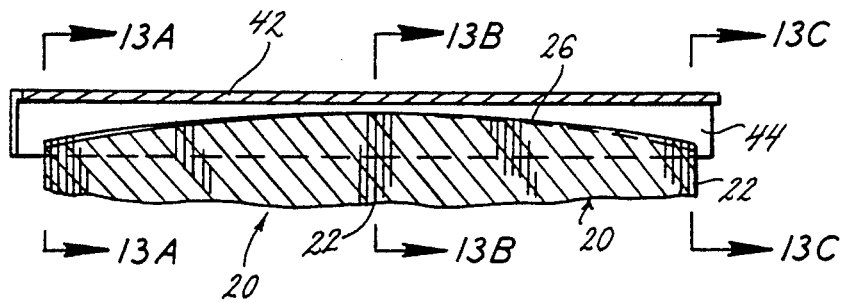
FIG. 12 is a partial cross-sectional view taken along the plane of line 12—12 in FIG. 11 and detailing the relative position between the channel member and the stator lamination projections.
Figures 13A, 13B, 13C:
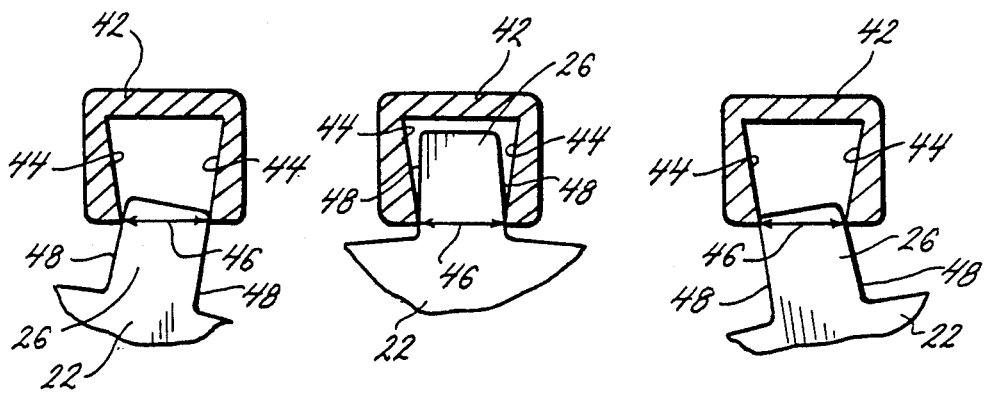
FIG. 13a is a partial cross-sectional view taken along the plane of line 13a in FIG. 12 detailing the relative positions between the projection of a stator lamination near one end of the stator lamination stack and the channel member.
FIG. 13b is a partial cross-sectional view taken along the plane of line 13b in FIG. 12 detailing the relative positions between a projection near the midpoint of the stator lamination stack and the channel member.
FIG. 13c is a partial cross-sectional view taken along the plane of line 13c in FIG. 12 detailing the relative positions between the channel member and a projection for a stator lamination near the other end of the stator lamination stack.

In a second embodiment of the present invention, the radial projections 26 as shown in the stator lamination 22 of FIG. 9, may be used in cooperation with a channel member 42 as shown in FIG. 10 to the same purpose. As shown in FIGS. 10 and 11, the channel member 42 can be used to position the successive laminations 22 in a vertical stack in a concentric orientation for initial stacking and winding. Subsequent to stacking and winding, as shown in FIG. 11, the channel member 42 may then be used to skew the laminations by pivoting the channel member 42 about the approximate mid-point of the stack in a manner very similar to that as used with the first embodiment. As shown in FIG. 12, after the lamination stack has been skewed, there has been relative radial movement between the channel member 42 and various ones of the laminations 22. More specifically, these end points of the lamination stack are shown in FIGS. 13a–c. As shown therein, channel member 42 has a pair of canted sidewalls 44 which provide a bearing surface against which the radial projection may come to rest at the end of its skew. Also, channel member 42 has a mouth opening 46 which determines the width of the radial projection 26 and, when combined with the angle of skew, determines the angle for slope of the sidewall 48 of the projection 26. In other words, as the radial projection 26 moves radially relative to the channel member 42, it also pivots or cants such that the mouth opening 46 must always correspond to the width of the radial projection 26 inserted therethrough. Obviously, if the radial projection has sidewalls 48 formed at an incorrect angle and which do not match the channel member sidewalls 44, then either binding or slippage could occur between channel member 42 and various ones of the laminations 22 which would result in either an improperly skewed stator or damage to the stator laminations and/or channel member.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a skewed stator core of a dynamoelectric machine comprising a plurality of plate-type laminations, each of said laminations having a plurality of winding slots so that as said laminations are stacked in a first substantially axially aligned orientation said slots align with each other to facilitate the automatic placement therein of an electrically conductive winding, the improvement comprising means for positively mechanically constraining the stator laminations to thereby maintain their relative orientation in a first substantially axially aligned orientation to facilitate their winding, said constraining means having means for retaining the relative alignment of the laminations while permitting relative radial movement between it and said laminations as the laminations are moved from said first substantially axially aligned orientation to a second substantially skewed orientation.

2. The device of claim 1 wherein the constraining means comprises at least one alignment slot in each lamination distinct from the plurality of winding slots, and a bolt for insertion through said alignment slot.

3. The device of claim 2 wherein each of said alignment slots are radially elongated.

4. The device of claim 3 wherein said bolt is flatted along opposite sides thereof for sliding engagement with the sides of the elongated slots.

5. The device of claim 1 wherein the constraining means comprises at least one radial projection extending outwardly from the periphery of each of the laminations and a channel member for contacting the sides of said projections.

6. The device of claim 5 wherein said channel member has a channel extending along the length thereof, said channel having opposing sidewalls which are skewed a predetermined angle for contacting the sides of the radial projection, which are also skewed a predetermined angle.

7. The device of claim 6 wherein the laminations are skewed a pre-determined angle about the stator axis, the sides of the radial projection being formed at an angle so that as the channel member is moved to skew the laminations, the radial projection moves with respect to the channel member and remains physically restrained thereby through the course of said movement.

8. The device of claim 7 wherein the channel has a portion of its sidewalls in contact with substantially each side of substantially each of the radial projections as the laminations are skewed to thereby physically restrain each of said laminations.

9. The device of claim 8 wherein the channel has a mouth defined by the inner edge of each of its sidewalls, and wherein said mouth is at least part of the portion thereof in contact with substantially each side of substantially each of the radial projections as the laminations are skewed to thereby physically restrain said laminations.

10. The device of claim 9 wherein the sides of the radial projection are formed at such an angle so that as the laminations are skewed, the radial projections move radially and cant with respect to the channel, with the amount of radial movement and cant for each respective projection being accommodated by the angles of its sides so that at least a portion of each radial projection extends through the channel mouth and is physically restrained thereby.

11. In a skewed stator core of a dynamoelectric machine comprising a plurality of plate-type laminations, each of said laminations having a plurality of winding slots so that as said laminations are stacked in a first substantially axially aligned orientation said slots align with each other to facilitate the automatic placement therein of an electrically conductive winding, the improvement comprising at least one alignment slot distinct from the winding slots in each of said laminations, said alignment slots having means to receive an alignment bolt, said alignment slots and bolt co-acting for positively mechanically constraining said plurality of laminations in a substantially axially aligned orientation as the laminations are stacked to form the stator core in said first orientation and the slots and the bolt together have means to maintain said plurality of laminations, and the slots and bolt together have means to permit controlled relative movement between said laminations and said bolt as the laminations are moved into a second substantially skewed orientation so that said laminations fan out substantially regularly to thereby form a skewed stator core.

12. The device of claim 11 wherein the alignment slots and bolt have means to permit controlled relative movement between the bolt and at least some of the laminations in a radial direction after said automatic placement therein of an electrically conductive winding.

13. The device of claim 12 wherein at least some of the slots are elongated, said elongation being oriented substantially radially.

14. The device of claim 13 wherein said bolt has one or more flats formed therealong, said flats being positioned to fit adjacent the sides of said elongations and thereby guide the bolt as it moves radially with respect to the laminations.

15. The device of claim 11 wherein each of said laminations is substantially identical, each of said alignment slots being substantially elliptical and oriented with their longer dimension being substantially radially aligned.

16. The device of claim 15 wherein the bolt has a pair of flats formed therealong, said flats being positioned to match and line up with the longer sides of the alignment slots to guide the bolt as it moves radially with respect to the laminations.

17. The device of claim 11 wherein each of said laminations has a pair of alignment slots, said slots being on substantially opposite sides of said laminations, and wherein a pair of alignment bolts are used.

18. In a skewed stator core for a dynamoelectric machine, said stator core comprising a plurality of plate-type laminations, each of said laminations having a plurality of winding slots so that as said laminations are stacked in a first substantially axially aligned orientation to form the stator core said slots align with each to facilitate the automatic placement therein of an electrically conductive winding, the improvement comprising a pair of alignment slots in each of said laminations, each of said slots having substantially rounded ends and a length greater than the corresponding dimension of each of a pair of associated alignment bolts, said slots being substantially radially oriented in their associated lamination and adapted to receive the alignment bolts to facilitate the assembly of a plurality of said laminations into a straight stator core, said straight stator core being adapted for winding by an automatic winding machine, and said slots and bolts thereby permitting controlled relative movement therebetween as opposing forces are applied to opposite ends of the bolts in a direction tangential to the core to thereby skew the wound stator core.

19. The device of claim 10 wherein the bolts have a pair of flats formed along their length to substantially match and align with the sidewalls of the slots to facilitate relative sliding movement therebetween.

20. In a skewed stator core of a dynamoelectric machine comprising a plurality of plate-type laminations, each of said laminations having a plurality of winding slots so that as said laminations are stacked in a first substantially axially aligned orientation said slots align with each other to facilitate the automatic placement therein of an electrically conductive winding, the improvement comprising a pair of radial projections extending outwardly from the periphery of each of the laminations, the sides of the radial projection being formed at an angle, said projections being oriented at substantially opposite sides of the lamination and in substantially the same location from lamination to lamination so that said projections line up as a plurality of laminations are stacked together, and a pair of channel members, each of said channel members having a channel with angled sidewalls for continuously contacting the projections and mechanically containing them as the channel members are pivoted to thereby skew the laminations in a controlled manner.

* * * * *